(12) United States Patent
Radusky

(10) Patent No.: US 11,659,912 B2
(45) Date of Patent: May 30, 2023

(54) SUNSCREEN DOSING DEVICE AND SUNSCREEN BOTTLE

(71) Applicant: Sunshotz, LLC, New York, NY (US)

(72) Inventor: Ross Radusky, New York, NY (US)

(73) Assignee: Sunshotz, LLC, Dallas, TX (US)

( * ) Notice: Subject to any disclaimer, the term of this patent is extended or adjusted under 35 U.S.C. 154(b) by 339 days.

(21) Appl. No.: 16/928,692

(22) Filed: Jul. 14, 2020

(65) Prior Publication Data
US 2022/0015524 A1  Jan. 20, 2022

(51) Int. Cl.
*A45D 34/04* (2006.01)
*A45D 34/00* (2006.01)
*B65D 5/46* (2006.01)

(52) U.S. Cl.
CPC ........ *A45D 34/04* (2013.01); *A45D 2034/002* (2013.01); *B65D 5/46072* (2013.01)

(58) Field of Classification Search
CPC .... A45D 34/04; A45D 2034/002; B65D 5/46; B65D 5/46072; B65D 5/4608; B65D 5/46088; B65D 5/4612; B65D 90/02; B65D 90/027

USPC ............ 229/117.09, 117.11, 117.12, 117.14, 229/117.15, 117.24–117.26
See application file for complete search history.

(56) References Cited

U.S. PATENT DOCUMENTS

| 5,137,209 A | * | 8/1992 | Roberts | B65D 5/46024 229/117.19 |
| 5,816,484 A | * | 10/1998 | Buchalski | B65D 25/32 229/114 |
| 7,857,197 B2 | * | 12/2010 | Rosendall | B65D 25/2873 220/759 |
| 9,816,857 B2 | | 11/2017 | Rastegar et al. | |
| 10,463,133 B2 | | 11/2019 | Sun et al. | |
| 2009/0183565 A1 | * | 7/2009 | Shamoon | G01F 19/00 220/666 |

FOREIGN PATENT DOCUMENTS

DE  102013109658 B3  9/2014

* cited by examiner

*Primary Examiner* — David J Walczak
(74) *Attorney, Agent, or Firm* — Patentbar International

(57) ABSTRACT

A sunscreen dosing device comprises a cup and a structured elongation which is an integral part of the cup. A first ear and a second ear are integral parts of the cup. For attaching the sunscreen dosing device to a body of a sunscreen bottle a free end of the structured elongation can be inserted in the first or the second ear.

11 Claims, 6 Drawing Sheets

SUNSCREEN DOSING DEVICE AND SUNSCREEN BOTTLE

FIELD OF THE INVENTION

The invention relates a sunscreen dosing device for applying a sufficient amount of sunscreen to a human body. Additionally, the invention relates to a sunscreen bottle with an attached sunscreen dosing device.

BACKGROUND OF THE INVENTION

U.S. Pat. No. 10,463,133 B2 relates to a portable sunscreen applying apparatus and a sunscreen application reminding method. The portable sunscreen applying apparatus includes an ultraviolet processing device to which a sunscreen accommodating device is connected. The sunscreen accommodating device is configured for accommodating sunscreens of different protection levels. The ultraviolet processing device includes an ultraviolet detecting unit, for detecting current ultraviolet and obtaining an intensity of the current ultraviolet. A sunscreen application reminding unit is as well a part of the ultraviolet processing device. The ultraviolet processing device and the sunscreen accommodating device are provided together, the intensity of the current ultraviolet is detected by the ultraviolet detecting unit in the ultraviolet processing device, and the user is reminded to use the appropriate sunscreen. The apparatus is of complicated construction and does not allow to measure a certain amount of sunscreen to be applied to the skin of a human body.

German Patent DE 10 2013 109 658 B3 relates to a dosing device for a sunscreen for application to the skin of a human body. The device comprises a base in or on which is formed: a first container for a quantity of sunscreen for application to an arm of the body, and at least one second container for an amount of sunscreen for application to one leg of the body. The volume of the second container is essentially twice as large as the volume of the first container. Furthermore, a trunk container and a head container can be provided, which together form a pictogram of a human body. The base can be connected to a hinged cover. The dosing device is complicated in design and cannot be attached to a sunscreen bottle and is not easy to use.

U.S. Pat. No. 9,816,857 B2 relates to a device with a processor which is configured to instruct an image sensor to capture first image data of a patch applied to a user's skin unprotected against an ultraviolet spectrum of radiation. The patch has a reflection coefficient in the ultraviolet spectrum. The processor is configured to instruct the image sensor to capture second image data of the user's skin after application of a sunscreen. A portion of a label on a bottle of the sunscreen lotion is a separable filter which is representative of the SBL level of the sunscreen lotion. The filter can be attached to the bottle by hanging around the bottle neck or releasable attaching the filter to the bottle. The device does not allow a doing of a correct amount of sunscreen.

Numerous persons have a problem using the correct amount of sunscreen. An inadequate amount of sunscreen doesn't fully protect as it should.

SUMMARY OF THE INVENTION

It is an object of the invention to come up with a sunscreen dosing device which is easy to use, inexpensive and simple of construction.

An embodiment of the sunscreen dosing device comprises a cup with a structured elongation. The cup is defined by an upper rim, a bottom and a side wall, connection the upper rim and the bottom. The structured elongation is an integral part of the cup. Furthermore, a first ear with a through hole is an integral part of the cup. A second ear with a through hole is an integral part of the cup and formed oppositely to the first ear of the structured elongation. The second ear is an integral part of the structured elongation. A free end of the structured elongation is insertable in the through hole of the first ear or the second ear.

The advantage of the sunscreen dosing device is that it is of one piece construction and can be produced in a simple and inexpensive way. Additionally, the sunscreen dosing device is easy to handle and to store.

In addition to manually fixing or attaching the sunscreen dosing device to a body part of other devices, a free end of the structured elongation is insertable in the through hole of the first ear or the second ear.

In order to allow a fixation or attachment of the sunscreen dosing device to the body part of another device, the structured elongation has a plurality of sub-structures which are arranged periodically along a longitudinal axis of the structured elongation. Each sub-structure has a maximal width and a minimal width, wherein the maximal width is larger than a width of the though holes formed in the first ear or second ear.

The sunscreen dosing device is made from a thermoplastic elastomer or an elastomer and the sunscreen dosing device is of a one piece construction. The sunscreen dosing device can be made by an injection molding process. The flexibility of the material of the sunscreen dosing device allows easy attachment other parts and avoids damage or breakage of the sunscreen dosing device.

According to a further embodiment, the sunscreen dosing device is formed with at least one radial reduction in thickness in the sidewall of the cup. The reduction in thickness and the reversible flexibility of the material of the sunscreen dosing device enable a collapsibility of the cup (reduction in height).

According to one embodiment, at least one mark for a defined amount of sunscreen is provided close to the upper rim at an inner surface of the sidewall of the cup. The advantage of the mark is a calibrated sunscreen dosing or measuring device.

It is a further object of the invention to come up with a sunscreen bottle which holds a device for measuring a defined amount of sunscreen which should be applied to a human body.

According to one possible embodiment of the invention, a sunscreen dosing device is attached by form and force fit to a body of a sunscreen bottle.

The advantage is that a measuring device for the correct amount of sunscreen is always available and ready to use.

In order to mount or attach the sunscreen dosing device to the sunscreen bottle, the sunscreen dosing device has a structured elongation. The structured elongation is flexible and can be wrapped around the body of the sunscreen bottle. For mounting purposes a free end of the structured elongation of the sunscreen dosing device is inserted into a through hole of a first ear or a second ear of a cup of the sunscreen dosing device.

In order to support or fix the sunscreen dosing device to the sunscreen bottle a plurality of sub-structures of the structured elongation are arranged periodically along a longitudinal axis of the structured elongation. Once the sunscreen dosing device is in form and force fit with the body of the sunscreen bottle one sub-structures, which has a maximal width larger than a width of the though holes of the first ear or the second ear, cooperates with the hole of the first ear or the second ear. This cooperation allows a secure fixation of the sunscreen dosing device to the body or body part of the sunscreen bottle.

The sunscreen dosing is made from a thermoplastic elastomer or an elastomer.

BRIEF DESCRIPTION OF THE DRAWINGS

For a better understanding of the various described implementations, reference should be made to the Detailed Description below, in conjunction with the following drawings.

DETAILED DESCRIPTION OF THE PREFERRED EMBODIMENTS

Reference will now be made in detail to various embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedure and components, have not been described in detail so as not to unnecessarily obscure aspects of the embodiments.

Figure 1:
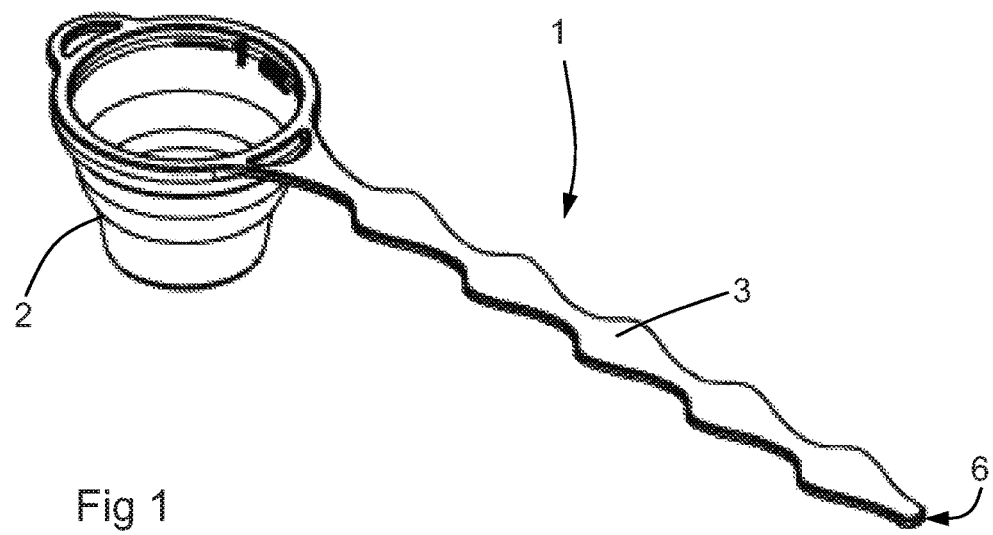
FIG. 1 shows a perspective view of the sunscreen dosing device.

FIG. 1 shows a perspective view of the sunscreen dosing device 1. The sunscreen dosing device 1 comprises a cup 2 for receiving the sunscreen and a structured elongation 3 which is integrally formed with the cup 2. The structured elongation 3 has a length L3 and a free end 6. Preferably, the sunscreen dosing device 1 is fabricated by an injection molding process from a material which exhibit a certain flexibility. The material of the dosing device 1 could be a thermoplastic elastomer or an elastomer. Thermoplastic elastomers (TPE), sometimes referred to as thermoplastic rubbers, are a class of copolymers or a physical mix of polymers (usually a plastic and a rubber) that consist of materials with both thermoplastic and elastomeric properties. While most elastomers are thermosets, thermoplastics are in contrast relatively easy to use in manufacturing, for example, by injection molding. Thermoplastic elastomers show advantages typical of both rubbery materials and plastic materials. The benefit of using thermoplastic elastomers is the ability to stretch to moderate elongations and return to its near original shape creating a longer life and better physical range than other materials. The principal difference between thermoset elastomers and thermoplastic elastomers is the type of a cross-linking bond in their structures. In fact, cross-linking is a critical structural factor which imparts high elastic properties.

Figure 2:
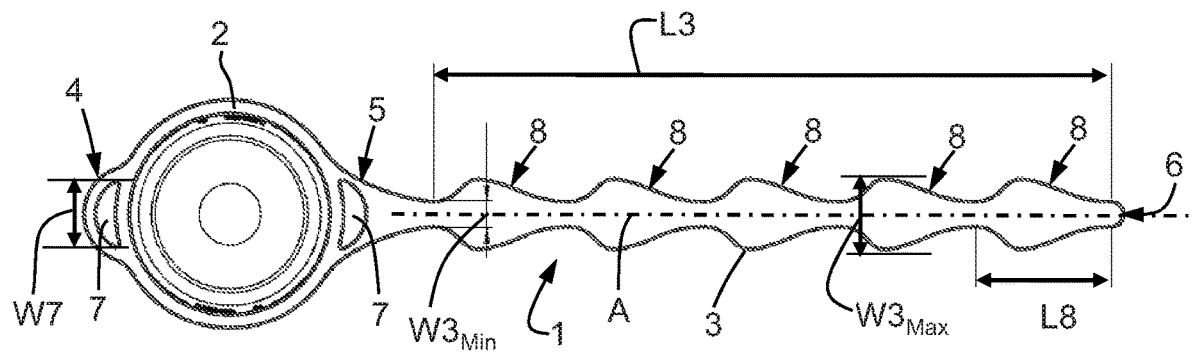
FIG. 2 shows a top view of the sunscreen dosing device.

FIG. 2 shows a top view of the sunscreen dosing device 1. The cup 2 of the sunscreen dosing device 1 is open at an upper rim 9 and closed at the opposite end by a bottom 10. A surrounding sidewall 11 (see FIG. 3) connects the upper rim 9 and the bottom 10. A first ear 4 and a second ear 5 formed oppositely to the first ear 4 are integral parts of the cup 2. In addition, the second ear 5 is an integral part of the structured elongation 3 and arranged opposite to the free end 6 of the structured elongation 3. Both the first ear 4 and the second ear 5 have a through hole 7 having a width W7. The structured elongation 3 has a plurality of sub-structures 8, which are arranged periodically along the longitudinal axis A of the structured elongation 3. Each sub-structure 8 has a length L8 which is smaller than the length L3 of the structured elongation 3. Each sub-structure 8 has a maximal width $W3_{Max}$ and a minimal width $W3_{Min}$. The maximal width $W3_{Max}$ is larger than the width W7 of the through holes 7. With the free end 6 the structured elongation 3 can be inserted into the through hole 7 of the first ear 4 or the second ear 5. The mechanical cooperation of the portion of one of the sub-structures 8 having the maximal width $W3_{Max}$ with the through hole 7 of the first ear 4 or the second ear 5 enables the fixation of the sunscreen dosing device 1, for example, to a sunscreen bottle 32 (see FIG. 13).

Figure 3:
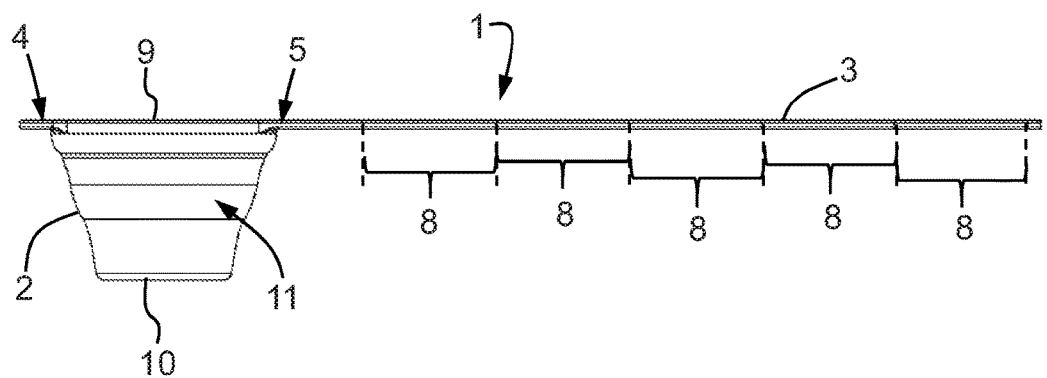
FIG. 3 shows a side view of the sunscreen dosing device.

FIG. 3 shows a side view of the sunscreen dosing device 1. The first ear 4 and the second ear 5 with the structured elongation 3 and its sub-structures 8 are flush with an upper rim 9 of the cup 2. Opposite to the upper rim 9 the cup 2 is closed by a bottom 10. The sidewall 11 is designed such that the cup 2 has a conical shape.

Figure 4:
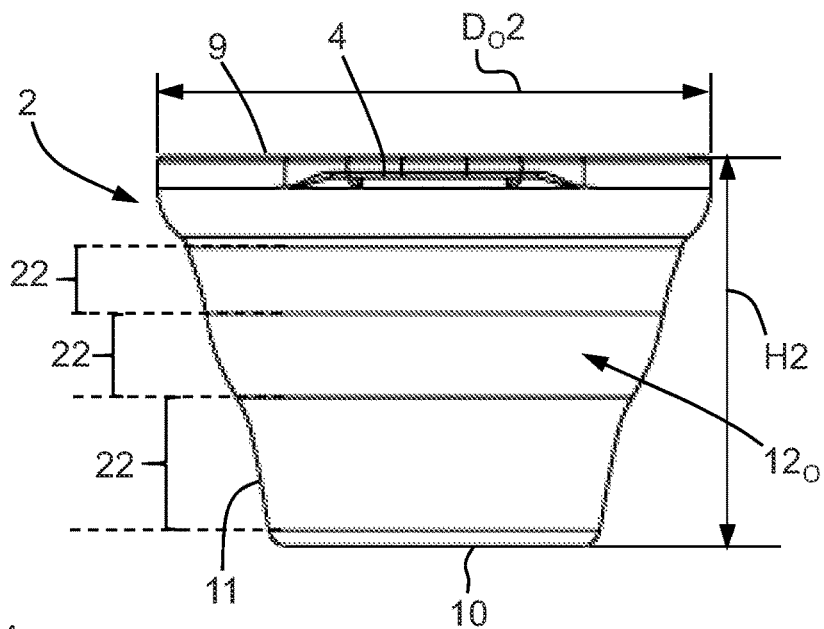
FIG. 4 shows a side view of a cup of the sunscreen dosing device.

FIG. 4 shows a side view of a cup 2 of the sunscreen dosing device 1. The present view is on the outer surface $12_O$ of the sidewall 11 of the cup 2 at which the first ear 4 is formed. The cup 2 has an outer diameter $D_O2$ of the upper rim 9 and an overall height H2. The cup 2 has a structured sidewall 11. In the embodiment shown here the structured outer surface $12_O$ of the sidewall 11 defines three distinct sections 22. The number of sections 22 should not be regarded as a limiting factor of the invention. It is clear for anybody skilled in the art that the number of sections 22 vary due to the design of the cup 2.

Figure 5:
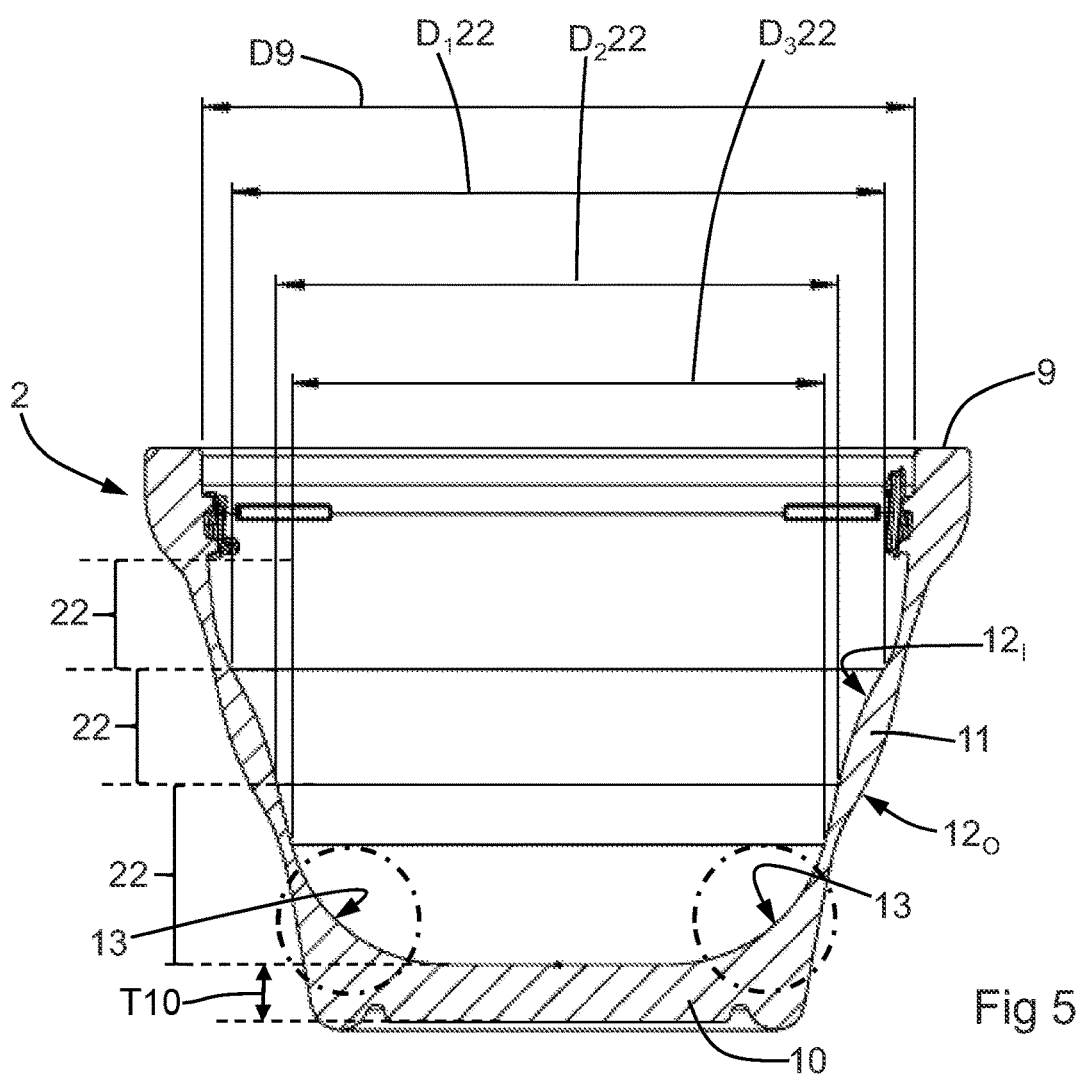
FIG. 5 shows a cross-sectional view the cup of the sunscreen dosing device.

FIG. 5 shows a cross-sectional view of the cup 2 of the sunscreen dosing device 1 as shown in FIG. 4. The cup 2 has an inner diameter D9 at the upper rim 9. From the upper rim 9 to the bottom 10 the inner diameters are decreasing. In the embodiment shown here, an inner diameter $D_1 22$ of the first section 22, following the upper rim 9, is smaller than the inner diameter D9 at the upper rim 9. An inner diameter $D_2 22$ of the second section 22, following the upper rim 9, is smaller than the inner diameter $D_1 22$ of the first section 22. An inner diameter $D_3 22$ of the third section 22, following the upper rim 9, is smaller than the inner diameter $D_2 22$ of the second section 22. An inner surface $12_I$ of sidewall 11 of the cup 2 has a rounded shape 13 at the transition from the inner surface $12_I$ of sidewall 11 to the bottom 10. The rounded shape 13 has the advantage that one can easily get all the sunscreen out of the cup 1. The bottom 10 of the cup 2 has a defined thickness T10.

Figure 6:
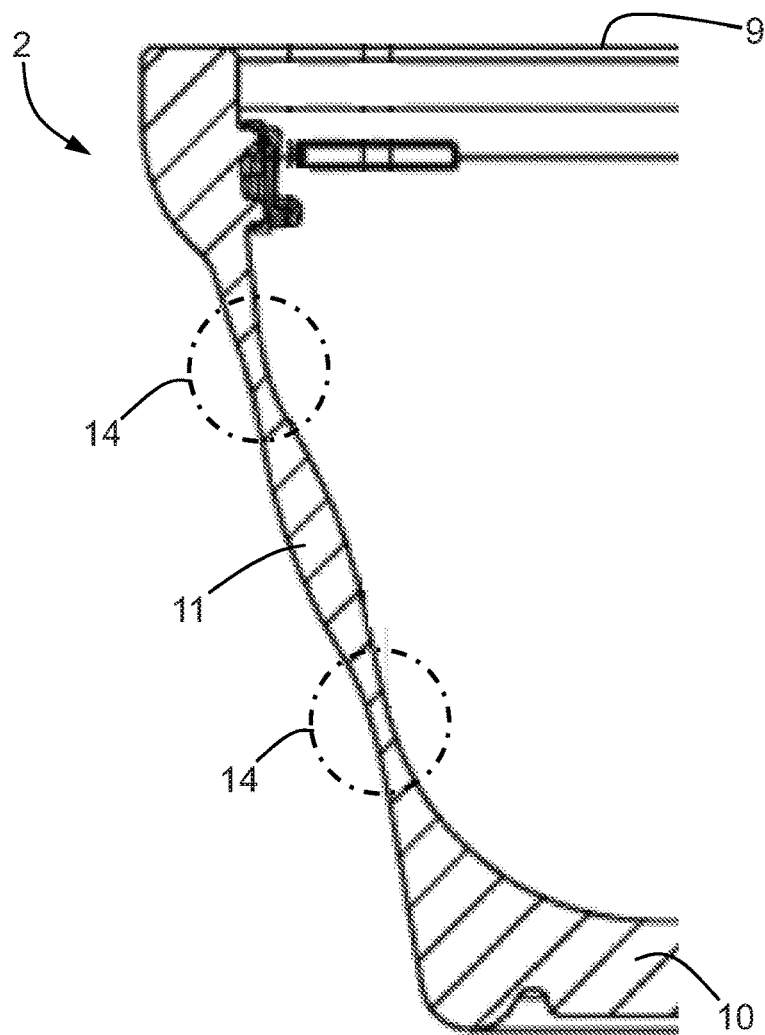
FIG. 6 shows an enlarged view of an inner wall portion of the cup of the sunscreen dosing device.

FIG. 6 shows the construction of the sidewall 11 of the cup 2 of the sunscreen dosing device 1. The sidewall 11 which stretches from the upper rim 9 to the bottom 10 has at least one radial reduction 14 in the sidewall 11 of thickness T11. The reduction 14 supports the collapsibility of the cup 2. The at least one reduction 14 is correlated with the distinct sections 22 (see FIG. 4) of the cup 2. In the possible embodiment shown here, the cup 2 has two radial reductions 14 in the sidewall 11.

Figure 7:
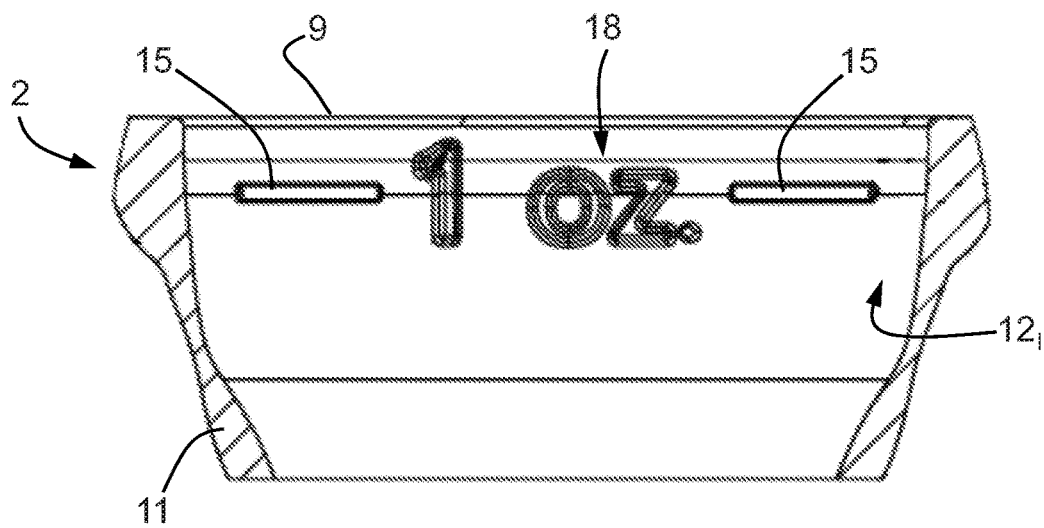
FIG. 7 shows an enlarged view of an inner wall portion of the cup of the sunscreen dosing device.

FIG. 7 shows an enlarged view of a portion of inner surface $12_I$ of the sidewall 11 of the cup 2. At least one mark 15 is provided close to the upper rim 9 the inner surface $12_I$ of the sidewall 11. The at least one mark 15 is stamped at the inner surface $12_I$ of the sidewall 11. The volume unit 18, written on the inner surface $12_I$ of the sidewall 11 should not be regarded as a limitation of the invention.

Figure 8:
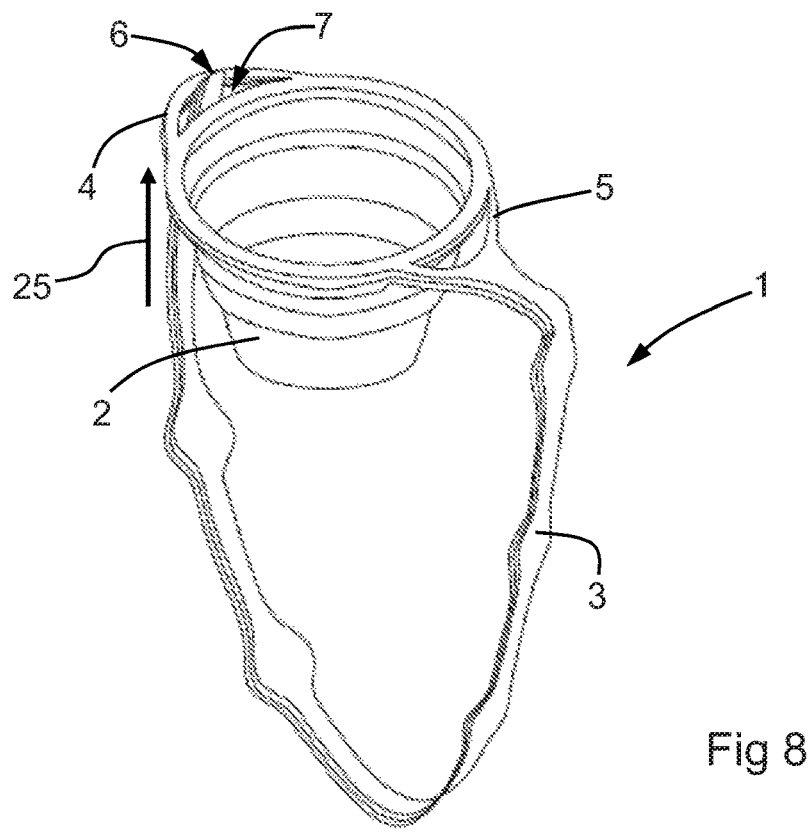
FIG. 8 shows a perspective view of one possible embodiment to use the structured elongation of the sunscreen dosing device.

FIG. 8 shows a perspective view of one possible embodiment for using the structured elongation 3 of the sunscreen dosing device 1. The free end 6 of the structured elongation 3 is inserted from the bottom up 25 into the through hole 7 of the first ear 4 of the cup 2.

Figure 9:
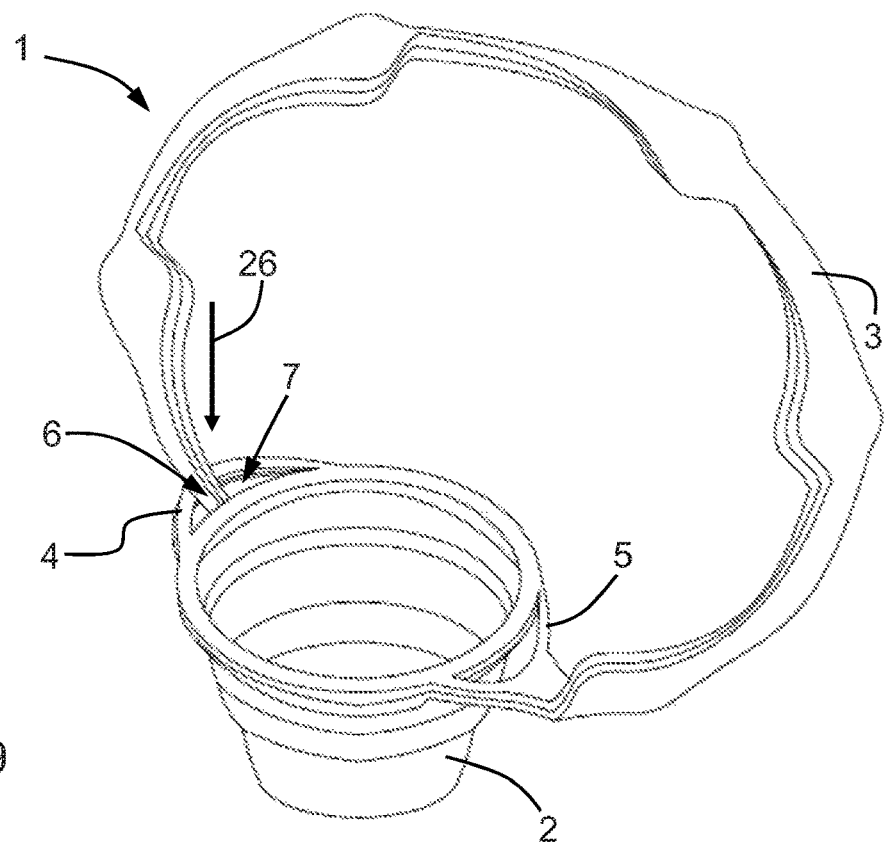
FIG. 9 shows a perspective view of another possible embodiment to use the structured elongation of the sunscreen dosing device.

FIG. 9 shows a perspective view of one further embodiment for using the structured elongation 3 of the sunscreen dosing device 1. The free end 6 of the structured elongation 3 is inserted from above 26 into the through hole 7 of the first ear 4 of the cup 2.

Figure 10:
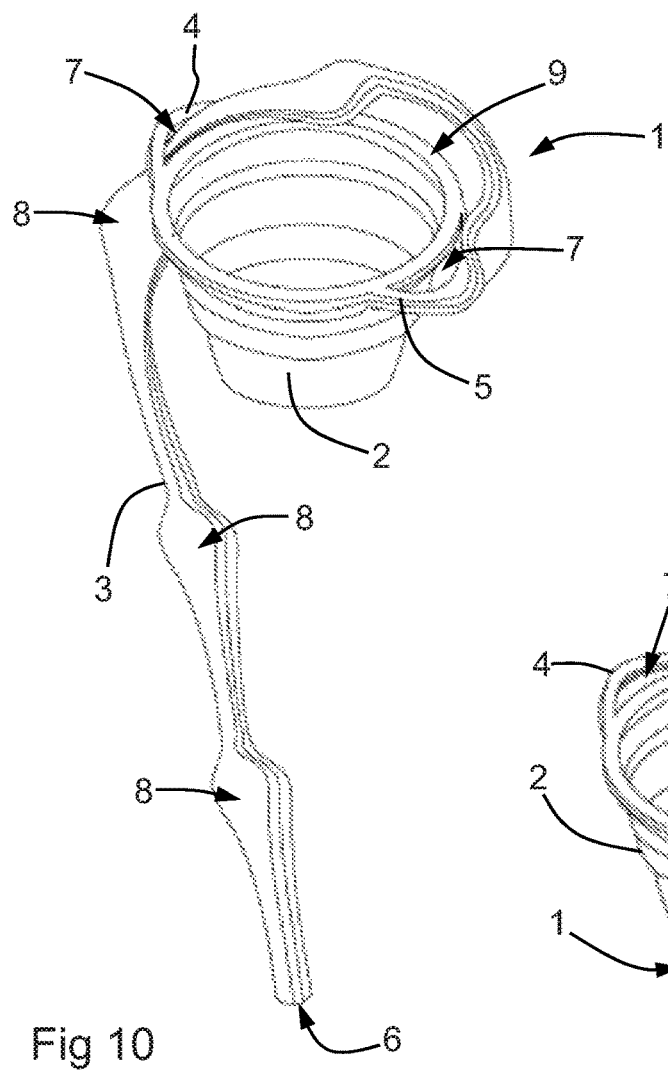
FIG. 10 shows a perspective view of the embodiment shown in FIG. 9, wherein the structured elongation is pulled tight.

FIG. 10 shows a perspective view of the embodiment shown in FIG. 9, wherein the structured elongation 3 is pulled tight. The structured elongation 3 is pulled with the free end 6 through the through hole 7 of the first ear 4. The structured elongation 3 comes close to the upper rim 9 of the cup 2, so that the sunscreen dosing device 1 can be removably fixed to an article (not shown). As shown in FIG. 2 the maximal width $W3_{Max}$ of a sub-structure 8 is cooperates with the smaller width W7 of the though holes 7. This cooperation holds the structured elongation 3 in place at the first ear 4.

Figure 11:
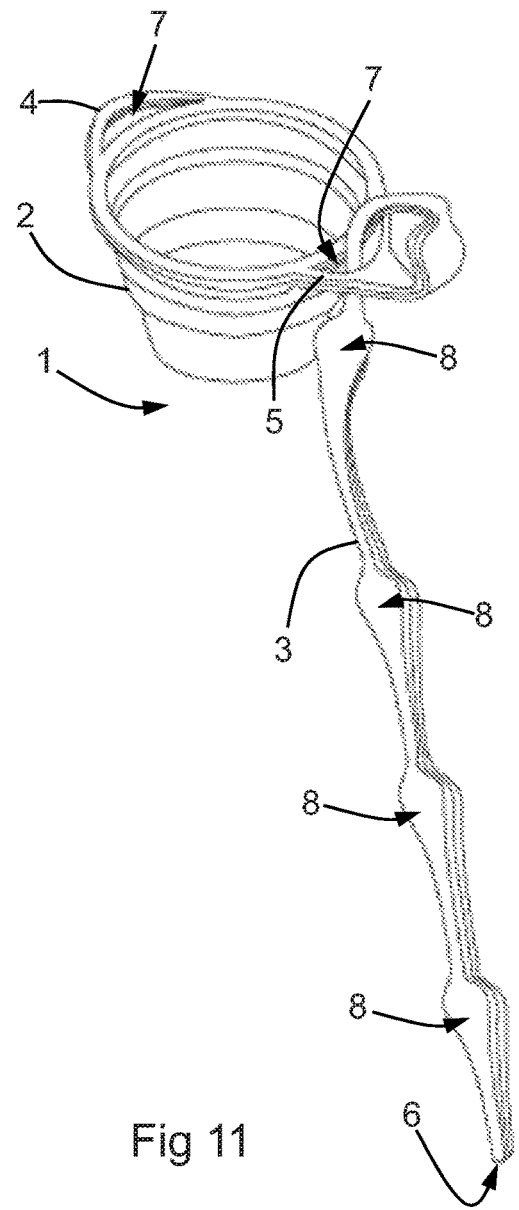
FIG. 11 shows a perspective view of a further embodiment, wherein the structured elongation is pulled tight.

FIG. 11 shows a perspective view of a further embodiment, wherein the structured elongation 3 is pulled tight. The structured elongation 3 is pulled with the free end 6 through the through hole 7 of the second ear 5. The structured elongation 3 comes close to the second ear 5 of the cup 2, so that the sunscreen dosing device 1 can be removably fixed to an article (not shown). As shown in FIG. 2, the maximal width $W3_{Max}$ of a sub-structure 8 cooperates with the smaller width W7 of the though holes 7. This cooperation holds the structured elongation 3 in place at the second ear 5.

Figure 12:
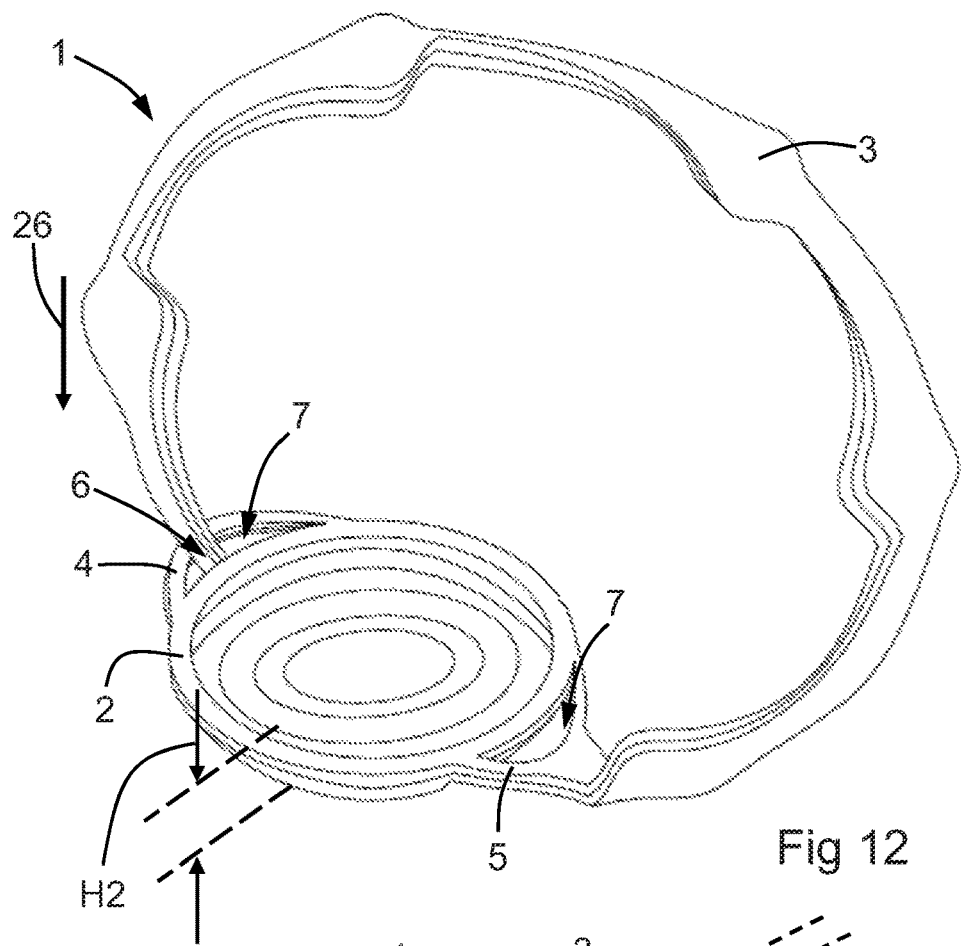
FIG. 12 shows a perspective view of a further possible embodiment to use the structured elongation of the sunscreen dosing device, wherein the cup is collapsed.

FIG. 12 shows a perspective view of a further possible embodiment to use the structured elongation 3 of the sunscreen dosing device 1. Here the cup 2 of the sunscreen dosing device is collapsed (the height H2 of the cup 2 is reduced as compared to the height H2 of the cup 2 in the not collapsed state (see FIG. 4)). The free end 6 of the structured elongation 3 is inserted from above 26 into the through hole 7 of the first ear 4 of the cup 2.

Figure 13:
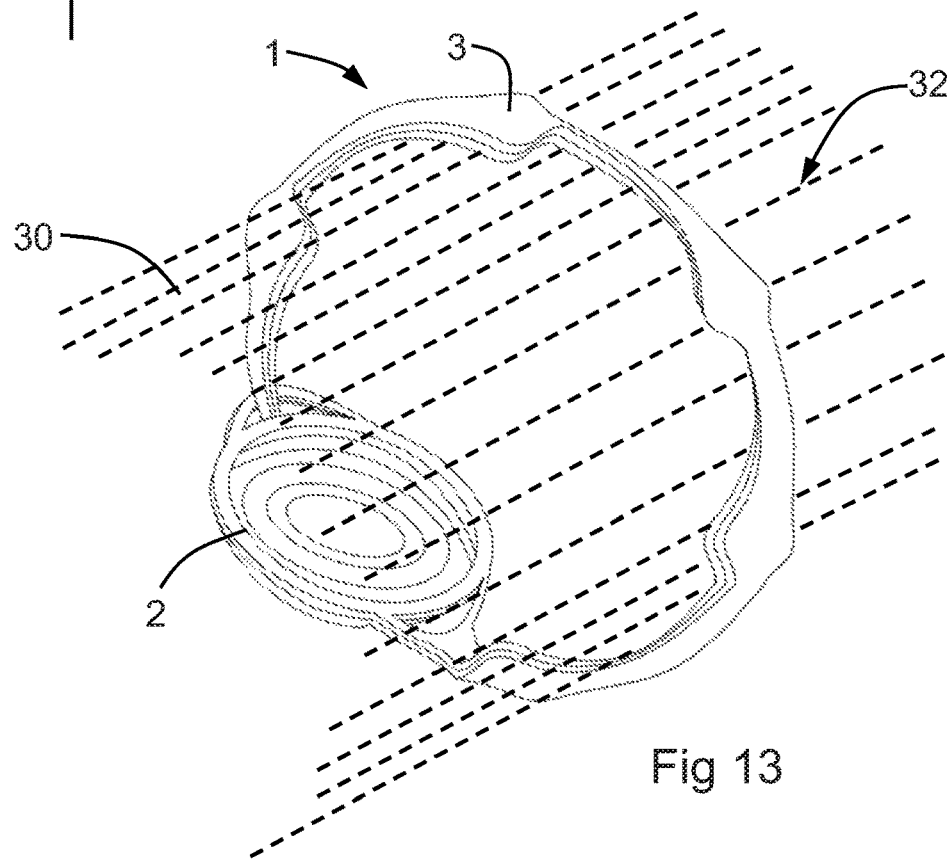
FIG. 13 shows a perspective view of the sunscreen dosing device fixed to a body of a sunscreen bottle; and Like reference numerals refer to corresponding parts throughout the drawings and specification.

FIG. 13 shows a perspective view of the sunscreen dosing device 1 fixed to a body 30 of a sunscreen bottle 32. Here the body 30 of the sunscreen bottle 32 is implied by a plurality of broken lines. The sunscreen dosing device 1 is attached to the body 30 of the sunscreen bottle 32 in that the collapsed cup 2 and the structured elongation 3 are in contact with the body 30 of the sunscreen bottle 32. It is noted here that the sunscreen dosing device 1 can be attached to the body 30 of the sunscreen bottle 32 as well with the cup 2 which is not collapsed. It is to be noted that the sunscreen dosing device 1 can be attached as well to the neck (not shown) of a sunscreen bottle 32. The expression body encompasses all parts of the sunscreen bottle 32.

The foregoing description has been described with reference to specific embodiments for explanation purposes. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

REFERENCE NUMERALS

1 Sunscreen dosing device
2 Cup
3 Structured elongation
4 First ear
5 Second ear
6 Free end
7 Through hole
8 Sub-structures
9 Upper rim
10 Bottom
11 Side wall
12I Inner surface
12O Outer surface
13 Rounded shape
14 Reduction
15 mark
18 volume unit
22 Distinct sections
25 From the bottom up
26 From above
30 Body of sunscreen bottle
32 Sunscreen bottle
A Longitudinal axis
$D_O 2$ outer diameter
D9 inner diameter
$D_1 22$ inner diameter
$D_2 22$ inner diameter
$D_3 22$ inner diameter
H2 height
L3 length
L8 length
T10 Thickness
T11 Thickness
$W3_{Max}$ Maximal width
$W3_{Min}$ Minimal width
W7 Width

What is claimed is:
1. A sunscreen dosing device comprising:
a cup defined by an upper rim, a bottom and a sidewall connecting the upper rim and the bottom;
a structured elongation integral with the cup;

a first ear with a through hole, the first ear being integral with the cup; and a second ear with a through hole, the second ear being integral with the cup and formed oppositely to the first ear of the cup, wherein the second ear is integral with the structured elongation and wherein a free end of the structured elongation is insertable in the through hole of the first ear or the second ear.

2. The sunscreen dosing device of claim 1, wherein the sunscreen dosing device is made of a reversible flexible material.

3. The sunscreen dosing device of claim 2, wherein the reversible flexible material is a thermoplastic elastomer or an elastomer.

4. The sunscreen dosing device of claim 1, wherein at least one radial reduction in thickness is formed in the sidewall of the cup.

5. The sunscreen dosing device of claim 4, wherein the at least one radial reduction in thickness of the sidewall forms the cup collapsible in height.

6. The sunscreen dosing device of claim 1, further comprising at least one mark for a defined amount of sunscreen to the upper rim at an inner surface of the sidewall of the cup.

7. A sunscreen dosing device comprising:
a cup defined by an upper rim, a bottom and a sidewall connecting the upper rim and the bottom;
a structured elongation integral with the cup;
a first ear with a through hole, the first ear being integral with the cup; and
a second ear with a through hole, the second ear being integral with the cup and formed oppositely to the first ear of the cup;
wherein the second ear is integral with the structured elongation, wherein the structured elongation comprises a plurality of sub-structures arranged periodically along a longitudinal axis of the structured elongation, each sub-structure having a maximal width and a minimal width, wherein the maximal width is larger than a width of the through hole of the first ear and the through hole of the second ear.

8. A sunscreen bottle comprising:
a sunscreen dosing device comprising:
a cup defined by an upper rim, a bottom and a sidewall connecting the upper rim and the bottom;
a structured elongation integral with the cup;
a first ear with a through hole, the first ear being integral with the cup; and
a second ear with a through hole, the second ear being integral with the cup and formed oppositely to the first ear of the cup;
wherein the second ear is integral with the structured elongation;
wherein a free end of the structured elongation is insertable in the through hole of the first ear or the second ear; and
wherein the sunscreen dosing device is attached by a form and force fit to a body of the sunscreen bottle.

9. The sunscreen bottle as claimed in claim 8, wherein a structured elongation of the sunscreen dosing device is wrapped around the body of the sunscreen bottle, and wherein a free end of the structured elongation of the sunscreen dosing device is inserted into the through hole of the first ear or the second ear of the cup.

10. The sunscreen bottle as claimed in claim 9, further comprising a plurality of sub-structures of the structured elongation arranged periodically along a longitudinal axis of the structured elongation, wherein once the sunscreen dosing device is in form and force fit with the body of the sunscreen bottle one of the sub-structures, having a maximal width which is larger than a width of the through holes of the first ear or the second ear, cooperates with the through hole of the first ear or the second ear.

11. The sunscreen bottle as claimed in claim 8, wherein the sunscreen dosing device is made from a thermoplastic elastomer or an elastomer.

\* \* \* \* \*